(12) United States Patent  
Dong et al.

(10) Patent No.: US 8,737,394 B2  
(45) Date of Patent: May 27, 2014

(54) ROUTE COMPUTATION METHOD AND SYSTEM, AND PATH COMPUTATION ELEMENT

(75) Inventors: Jixiong Dong, Shenzhen (CN); Fatai Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 692 days.

(21) Appl. No.: 12/824,690

(22) Filed: Jun. 28, 2010

(65) Prior Publication Data

US 2010/0265943 A1   Oct. 21, 2010

Related U.S. Application Data

(63) Continuation of application No. PCT/CN2008/073654, filed on Dec. 22, 2008.

(30) Foreign Application Priority Data

Dec. 29, 2007   (CN) .......................... 2007 1 0125724

(51) Int. Cl.
*H04L 12/28* (2006.01)

(52) U.S. Cl.
USPC .......................................................... 370/389

(58) Field of Classification Search
USPC .......................................................... 370/389
See application file for complete search history.

(56) References Cited

U.S. PATENT DOCUMENTS 6,061,626 A * 5/2000 Meredith ...................... 701/527  
7,599,302 B2 * 10/2009 Vasseur et al. ................ 370/248

(Continued)

FOREIGN PATENT DOCUMENTS

CN   1561048   1/2005  
CN   1588920   3/2005

(Continued)

OTHER PUBLICATIONS

Hiroshi Matsuura et al., "Hierarchically distributed PCE for backup strategies on optical network", Communications and Electronics, 2006, ICCE'06, First International AL Conference on ,IEEE, PI, Oct. 1, 2006, pp. 135-140.

(Continued)

*Primary Examiner* — Hassan Kizou  
*Assistant Examiner* — Deepa Belur  
(74) *Attorney, Agent, or Firm* — Staas & Halsey LLP (57) ABSTRACT

A route computation method and system, and a path computation element (PCE) are provided. In particular, the method includes: receiving, by a bottom-level PCE which manages a routing domain including a destination node, a path computation command, performing a route computation on the routing domain managed by the bottom-level PCE, obtaining a path segment set with a destination node serving as an endpoint, and sending the obtained path segment set to an upper-level PCE of the bottom-level PCE, sending, by the upper-level PCE receiving the path segment set sent by a first lower-level PCE, the path computation command to a second lower-level PCE, receiving path segment sets sent by all lower-level PCEs, and combining and sending all the received path segment sets to an upper-level PCE of the upper-level PCE, until a top-level PCE receives path segment sets sent by all lower-level PCEs of the top-level PCE; and combining, by the top-level PCE, all the received path segment sets to generate a set of paths between the destination node and the source node.

10 Claims, 3 Drawing Sheets

(56) References Cited

U.S. PATENT DOCUMENTS

| | | | |
|---|---|---|---|
| 7,701,940 B2* | 4/2010 | Novello et al. | 370/390 |
| 7,933,252 B2* | 4/2011 | Kubler et al. | 370/338 |
| 8,369,213 B2* | 2/2013 | Vasseur et al. | 370/228 |
| 2006/0039391 A1 | 2/2006 | Vasseur et al. | |
| 2006/0092935 A1* | 5/2006 | Lakshman et al. | 370/389 |
| 2006/0120288 A1* | 6/2006 | Vasseur et al. | 370/235 |
| 2006/0171320 A1 | 8/2006 | Vasseur et al. | |
| 2006/0198308 A1* | 9/2006 | Vasseur et al. | 370/238 |
| 2007/0086455 A1* | 4/2007 | Allan et al. | 370/389 |
| 2007/0160039 A1 | 7/2007 | Xu | |
| 2008/0002664 A1 | 1/2008 | Li et al. | |
| 2008/0219272 A1* | 9/2008 | Novello et al. | 370/401 |
| 2009/0089722 A1* | 4/2009 | Lockman et al. | 716/2 |
| 2012/0195229 A1* | 8/2012 | Chen | 370/254 |

FOREIGN PATENT DOCUMENTS

| | | |
|---|---|---|
| CN | 101083548 | 12/2007 |
| EP | 1 460 808 A2 | 9/2004 |
| EP | 1460808 | 9/2004 |
| EP | 1 863 235 A1 | 12/2007 |
| JP | 2005-252368 | 9/2005 |

OTHER PUBLICATIONS

European Search Report dated Nov. 15, 2010 in corresponding European Patent Application 08871309.4.

Y. Rekhter, editor. "A Border Gateway Protocol 4 (BGP-4)", Network Working Group, Internet Engineering Task Force, Mar. 1995, pp. 1-51.

JP Vasseur, editor. "A Backward Recursive PCE-based Computation (BRPC) procedure to compute shortest inter-domain Traffic Engineering Label Switched Paths", Network Working Group Internet Draft, Internet Engineering Task Force, Sep. 2007, pp. 1-16.

J.L. Le Roux, editor. "OSPF Protocol Extensions for Path Computation Element (PCE) Discovery", Network Working Group Internet Draft, Internet Engineering Task Force, Oct. 2007, pp. 1-18.

J. Moy, editor. "OSPF Version 2", Network Working Group, The Internet Society, Apr. 1998, pp. 1-194.

Written Opinion of the International Searching Authority mailed Mar. 26, 2009 issued in corresponding International Patent Application No. PCT/CN2008/073654.

Chinese Office Action mailed Apr. 26, 2011 issued in corresponding Chinese Patent Application No. 200710125724.9.

European Office Action dated Nov. 11, 2011 issued in corresponding European Patent Application No. 08871309.4.

International Search Report, mailed Mar. 26, 2009, in corresponding International Application No. PCT/CN2008/073654 (4 pp.).

Japanese Office Action issued Oct. 2, 2012 in corresponding Japanese Patent Application No. 2010-540006.

Japanese Office Action mailed May 29, 2012 issued in corresponding Japanese Patent Application No. 2010-540006.

Zhang, R. et al., A Backward Recursive PCE-based Computation (BRPC) procedure to compute shortest inter-domain Traffic Engineering Label Switched Paths, Networking Working Group, Sep. 4, 2007, pp. 1-16.

* cited by examiner

ROUTE COMPUTATION METHOD AND SYSTEM, AND PATH COMPUTATION ELEMENT

CROSS-REFERENCE TO RELATED APPLICATIONS

This application is a continuation of International Application No. PCT/CN2008/073654, filed on Dec. 22, 2008, which claims priority to Chinese Patent Application No. 200710125724.9, filed on Dec. 29, 2007, both of which are hereby incorporated by reference in their entireties.

FIELD OF THE TECHNOLOGY

The present invention relates to the field of communications, and more particularly to a route computation method and system, and a path computation element (PCE).

BACKGROUND OF THE INVENTION

A communication network is a set of geographically distributed nodes and communication links between the nodes for data transmission. The communication between nonadjacent nodes in the communication network may be realized through intermediate nodes, and this saves resources of the communication network and improves the resource utilization. Currently, various types of communication networks exist, such as synchronous digital hierarchy/synchronous optical network synchronous (SDH/SONET) networks and IP networks. Nodes in the communication network usually communicate with each other by exchanging data frames or packets over the network, and the frames or packets are defined by a specific protocol such as Transmission Control Protocol/Internet Protocol (TCP/IP). Herein, the protocol means a set of rules which are similar to TCP/IP and define inter-node interaction.

When the communication network becomes huge, management and maintenance will be difficult. Therefore, to facilitate management, the communication network is usually divided into multiple routing domains or autonomous systems (ASs). Generally, in the network inside an AS, conventional intra-domain routers that execute intra-domain routing protocols are coupled together and managed by common powers. For the purpose of improving route flexibility, an AS is usually divided into multiple areas. Generally speaking, a domain is any collection of network elements within a common sphere of address management or path computation responsibility. Examples of domains include areas, AS, and multiple ASs. For ease of description, routing domains, ASs and areas are collectively referred to as domains herein. The specific meaning of a domain depends on its context. When nodes are added for data exchange, inter-domain routers that execute inter-domain routing protocols are adopted to interconnect the nodes in different domains. Such inter-domain routers are also referred to as border routers.

An example of inter-domain routing protocol is the Border Gateway Protocol (BGP) version 4. The BGP implements inter-domain routing by exchanging routes and reachable information between adjacent inter-domain routers in the system. The BGP usually adopts a reliable transmission protocol such as TCP to establish connections and sessions. An example of intra-domain routing protocol, or Interior Gateway Protocol (IGP), is the Open Shortest Path First (OSPF) routing protocol. The OSPF protocol is based on a link state technology, and therefore is also a link state routing protocol. The link state routing protocol defines a mode of exchanging and handling intra-domain routing information and network topology information, for example, in the OSPF protocol, the information is exchanged through Link State Advisement (LSA).

The emergence and development of Multi-Protocol Label Switching (MPLS) technology meets the new requirements for data network development, such as guaranteed available bandwidth and fast restoration. The MPLS technology allows the establishing of end-to-end tunnels in an IP/MPLS network having Label Switched Routers (LSRs). Such tunnels are generally referred to as Label Switch Paths (LSPs). LSP establishment involves the computation of a path of an LSR in the network, which is generally called route computation.

The MPLS technology has also been introduced to the field of optical transport networks, based on which an Automatically Switched Optical Network (ASON) has been developed. Unlike the conventional optical transport network that provides network connection services through manual or semi-automatic configuration, the ASON provides network connection services through automatic establishment of the control plane. The ASON may be divided into a transport plane that bears network services, a management plane that implements management functions, and a control plane that runs a control protocol.

The technology used by the control plane of the ASON is called Generalized Multi-Protocol Label Switching (GMPLS), which extends the MPLS technology to include the Link Management Protocol (LMP), routing protocol and signaling protocol. The LMP obtains the connection types supported by the link and the number of resources through packet exchange based on discovery of neighboring relations. Such information is referred to as Traffic Engineering (TE) information, and a link that includes TE information is referred to as a TE link. Inside a domain, the local link TE information is advertised to other nodes in the domain through a routing protocol such as OSPF-TE. Based on the information, when the network management system or a user requests the network to establish a network connection, the ingress node of this connection can perform path computation to obtain the link sequence of the connection, and, through a signaling protocol such as the Resource Reservation Protocol-Traffic Engineering (RSVP-TE), send a request to the nodes on the path for resource allocation and establish a cross connection, thereby establishing an end-to-end connection.

For both IP/MPLS and optical transport networks, the division of domains is a concern. Especially, when a network with TE management capabilities is divided into multiple domains, each node only stores the TE information of the local domain and the reachable information of other domains, which reduces the impact of the change in the network topology on new service deployment and congestion recovery, and enhances the network scalability. However, as each node only stores the TE information of the local domain and the reachable information of other domains but does not know the complete TE information of other domains, it becomes a problem to be solved how to compute an end-to-end path that meets all the requirements on bandwidth, switching capability, route separation, protection, and user policies in the case of multiple domains.

To solve the route computation or path computation (hereinafter collectively referred to as route computation for ease of description) in the case of multiple domains, the Domain-Domain Routing Protocol (DDRP) adopts a hierarchical network model, in which, a lower-level domain is represented by an agent node in the upper level. The agent node can advertise abstract topologies, inter-domain links, and reachable addresses that represent the domain. Thus, a hierarchical network takes shape. When an end-to-end path that crosses multiple domains is computed, the strict route in the domain of the requesting node and the subsequent loose route of the border node are computed first. When signaling flows to the border of an intermediate domain, the strict route in this intermediate domain is computed through domain border computation and the like. Such operations are continuously performed until the signaling reaches the domain of the destination node.

Figure 1:
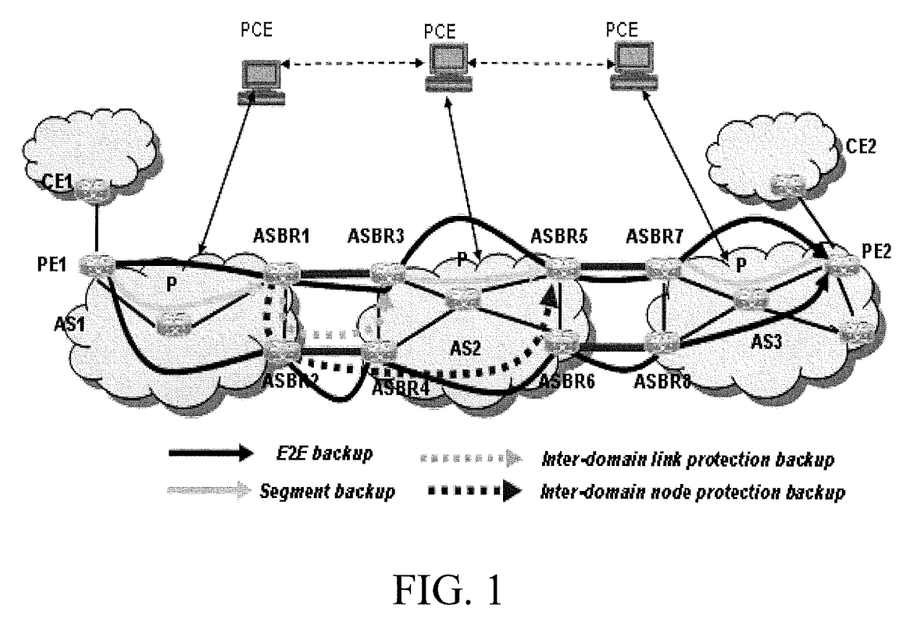
FIG. 1 is a schematic view of a network structure showing a cross-domain path computation in the prior art.

As shown in FIG. 1, in another technology that solves the route computation in the case of multiple domains, that is, PCE technology, each PCE stores all TE information of the domain that the PCE serves (for ease of description, the TE information includes network topology information herein). A node requesting route computation is called a Path Computation Client (PCC). The PCC sends a request that includes route computation parameters to a PCE, and the PCE performs a route computation according to the Traffic Engineering Database (TED) stored therein and feeds back the result to the PCC. The PCE may store TE information of one or more domains. When a route crossing multiple domains is computed, if the route is beyond the service area of the local PCE, the PCE will use the Path Computation Element Communication Protocol (PCECP) to collaborate with other related PCEs so as to compute the final route.

During the implementation of the present invention, the inventor finds that, the prior art has at least the following problems.

According to the solution provided by a first conventional technology, route computation is a serial process. At the head node, only the ingress and egress information of some domains that the path passes through is available. Because the real TE information in related domains is unavailable, it cannot be determined whether route computation can succeed from the ingress to egress until signaling flows to the corresponding domain border and triggers domain border computation. Thus, it may frequently occur that signaling discovers during the transmission that no route is available or no route satisfies related constraints. As a result, route establishment is rolled back for multiple times, and the previously established cross connection has to be removed for re-establishment. In addition, for this technical solution, it is difficult to compute end-to-end diverse routes (different paths with the same source and destination).

The second conventional technology adopts a flat single-level model, that is to say, all PCEs are equally important. When the network is complex or large, it is difficult to manage the PCEs. In addition, as hierarchical abstraction is not applied to the network, cross-domain route computation entirely relies on the exchange of TE information of different domains between different PCEs. When a service passes through many domains, communication between related PCEs will be too frequent and the amount of information exchanged will be huge, which reduces the efficiency and reliability of route computation.

SUMMARY OF THE INVENTION

Accordingly, the present invention is directed to a route computation method and system, and a PCE, which can effectively perform an end-to-end cross-domain path computation.

In an embodiment, the present invention provides a route computation method, which includes the following steps.

A first bottom-level PCE receives a path computation command, performs a route computation on a routing domain managed by the first bottom-level PCE, obtains a path segment set with a first node serving as an endpoint, and sends the obtained path segment set to an upper-level PCE of the first bottom-level PCE.

The upper-level PCE receiving the path segment set sent by a lower-level PCE sends the path computation command to another lower-level PCE according to routing domains that a path to be established between the first node and a second node sequentially passes through, receives path segment sets sent by all lower-level PCEs, and combines and sends all the received path segment sets to an upper-level PCE of the upper-level PCE, until a top-level PCE receives path segment sets sent by all lower-level PCEs of the top-level PCE.

The top-level PCE combines all the received path segment sets to generate a set of paths between the first node and the second node.

In an embodiment, the present invention further provides a PCE, which includes a path computation command receiving module, a path segment information receiving module, a path combination module, and a path segment set sending module.

The path computation command receiving module is configured to receive a path computation command.

The path segment information receiving module is configured to send the path computation command to lower-level PCEs one by one according to a sequence of routing domains that a path to be established passes through after the path computation command receiving module receives the path computation command. Specifically, the path segment information receiving module is configured to receive a path segment set returned by one lower-level PCE and send the path computation command to another lower-level PCE, until path segment sets returned by all lower-level PCEs are received.

The path combination module is configured to combine the path segment sets received by the path segment information receiving module, and send the combined path segment sets.

The path segment set sending module is configured to send the received combined path segment sets to an upper-level PCE.

In an embodiment, the present invention also provides a route computation method, which includes the following steps.

A path computation command is received.

The path computation command is sent to lower-level PCEs one by one according to a sequence of routing domains that a path to be established passes through; specifically, a path segment set returned by one lower-level PCE is received, and the path computation command is sent to another lower-level PCE, until path segment sets returned by all lower-level PCEs are received.

The received path segment sets are combined, and the combined path segment sets are sent.

The received combined path segment sets are sent to an upper-level PCE.

In an embodiment, the present invention further provides a route computation system, which includes a top-level PCE, a first bottom-level PCE, and an upper-level PCE receiving a path segment set sent by a lower-level PCE.

The top-level PCE is configured to receive a path computation request, compute routing domains that a path to be established between a first node and a second node sequentially passes through according to information about the first node and the second node carried in the path computation request, and directly send a path computation command to the first bottom-level PCE, or send the path computation command to the first bottom-level PCE level by level.

The first bottom-level PCE is configured to perform a route computation on a routing domain managed by the first bottom-level PCE after receiving the path computation command, obtain a path segment set with the first node serving as an endpoint, and send the obtained path segment set to an upper-level PCE of the first bottom-level PCE.

The upper-level PCE receiving the path segment set sent by a lower-level PCE is configured to send the path computation command to another lower-level PCE according to the routing domains that the path to be established between the first node and the second node sequentially passes through, receive path segment sets sent by all lower-level PCEs, and combine and send all the received path segment sets to an upper-level PCE of the upper-layer PCE receiving the path segment set sent by the lower-level PCE, until the top-level PCE receives path segment sets sent by all lower-level PCEs of the top-level PCE.

Here, the top-level PCE combines all the received path segment sets to generate a set of paths between the first node and the second node.

It can be seen from the above that, through the technical solutions of the present invention that adopt the hierarchical method for sequentially computing the path segment sets, an end-to-end cross-domain path computation can be effectively performed.

DETAILED DESCRIPTION OF THE EMBODIMENTS

The route computation method and system and the PCE of the present invention are illustrated below with reference to the accompanying drawings and embodiments.

Figure 2:
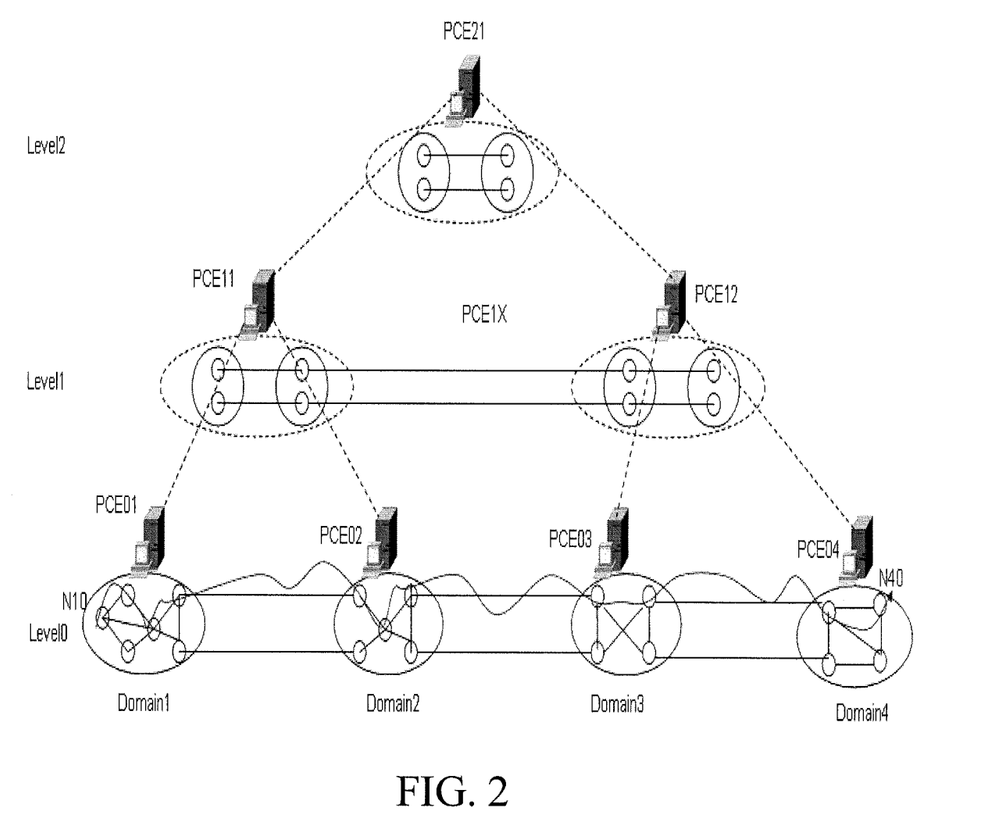
FIG. 2 is a schematic view of a network structure applying a route computation method according to an embodiment of the present invention.

The route computation method according to embodiments of the present invention may be applied to a network structure as shown in FIG. 2. As shown in FIG. 2, the network is divided into multiple levels. When multiple domains are interconnected, for each bottom-level routing domain, one or more PCEs are directly responsible for the intra-domain routing topology and route computation of the domain; then, multiple bottom-level routing domains are directly managed by a higher-level PCE, and the higher-level PCE has inter-domain routing topologies of the bottom-level routing domains, intra-domain routes of the routing domain directly managed thereby, as well as intra-domain routing topologies of some domains based on a policy. Based on this, the entire network is managed by hierarchical abstraction based on PCEs. The number of levels of the network is not limited, and may be determined according to the network scale or policy. All routing topologies that each PCE is responsible for (a set of routing topologies that each lower-level PCE is responsible for) may be referred to as computation domains of the PCE.

When multiple domains are interconnected in a large-scale network as proposed in embodiments of the present invention, for each bottom-level routing domain, one or more PCEs are responsible for the intra-domain routing topology and route computation of the domain; then, a PCE of multiple bottom-level routing domains is abstracted as a higher-level PCE, and the higher-level PCE has inter-domain routing topologies of the bottom-level routing domains, as well as intra-domain routing topologies of some domains based on a policy. Based on this, the entire network is managed by hierarchical abstraction based on PCEs. The number of levels of the PCEs is not limited, and may be determined according to the network scale or policy.

The present invention is further illustrated in detail through embodiments.

As shown in FIG. 2, the bottommost level (i.e. Level0) is composed of multiple routing domains: Domain1, Domain2, Domain3, and Domain4. Of course, Level0 may also have several routing domains besides Domain1, Domain2, Domain3, and Domain4, which will not be described herein, for ease of illustration. Each bottom-level routing domain has a directly corresponding PCE responsible for the routing topology and route computation of the domain. The PCEs in Level0 are PCE01, PCE02, PCE03, and PCE04.

The topologies that the PCEs in the bottom level are responsible for are abstracted to form a topology of a first level (i.e. Level1), and a PCE in Level1 is responsible for the topology. As shown in the figure, corresponding domains Domain1 and Domain2 that PCE01 and PCE02 are responsible for are abstracted, so that the domains are located in a same computation domain. The computation domain has routes between the bottom-level routing domains corresponding to the PCEs, and PCE11 is responsible for computation. The abstract topologies of the domains that PCE11 is responsible for include inter-domain link information of the domains. The abstraction method of PCE12 is similar to that of PCE11, so the details will not be described herein again.

The topology of Level1 may be abstracted to a higher level. For example, hierarchical abstraction is further applied to the computation domain of the routing topologies that PCE11, PCE12, ..., PCE1X in Level1 are responsible for, and PCE21 in Level2 is made responsible for the routing topologies. The routing topologies of PCE21 include interconnection information between PCE11 and PCE12. In other cases, based on a policy, PCE21 may also include internal route information of PCE11 and PCE12.

Meanwhile, though not noted in the figure, persons skilled in the art can deduce according to the above description that, PCE11, PCE12, and PCE21 are not bottom-level PCEs, but may also directly manage a routing domain. In this case, the routing domains directly managed by PCE11, PCE12, and PCE21 are respectively located in Level1, Level1, and Level2. PCE11, PCE12, and PCE21 directly compute intra-domain routes thereof, as well as routes between the routing domain and the computation domain of other PCEs in the same level. The route computation method in this case is basically the same as that in the embodiments of the present invention, except that the intra-domain routes are not computed by the bottom-level PCE, so no separate description will be provided hereinafter.

PCEs in the same level or different levels diffuse the corresponding routing topology information through a routing protocol (for example, based on the IGP or BGP). PCEs in the same level or different levels diffuse capability and position information of PCEs through a PCE Discovery Protocol.

In this embodiment, when a source node initiates a path computation request to a PCE of a domain thereof, the PCE receiving the request makes a determination according to source and destination address information carried in the request message. If the requested destination node is not in the same routing domain as the source node, the PCE of the domain finds out a common upper-level PCE (marked as a top-level PCE) according to capability information of PCEs in each level. The computation domain of the upper-level PCE covers both the source node and the destination node, so that the upper-level PCE completes the computation of a path to the destination node.

According to different embodiments, the path request message received by the top-level PCE from the source node may carry information about a domain sequence that the path passes through. If the path computation request of the source node carries the information about the domain sequence that the path passes through, the top-level PCE completes the corresponding path computation according to the domain sequence. Otherwise, the top-level PCE determines the domain sequence of the entire cross-domain path according to abstract inter-domain topology information therein and according to a certain policy (for example, the shortest sequence).

The top-level PCE initiates a path computation request to a lower-level PCE adjacent to the destination routing domain (marked as the right side of the top-level PCE). The process repeats, until the path computation request is sent to a bottommost-level PCE of the domain of the destination node.

The bottommost-level PCE computes a corresponding optimal path segment set in the local domain, and returns the path segment set to an upper-level PCE.

After receiving the path computation request, the corresponding upper-level PCE sends the path computation request to other PCEs managed thereby according to the returned path segment set information. The process repeats, until the path computation request is sent to a bottommost-level PCE of a node that a domain egress of the path segment belongs to.

The upper-level PCE returns the computed path segment set to upper-level PCEs thereof, until the path segment set is returned to the top-level PCE.

The top-level PCE initiates a path computation request to a lower-level PCE on the left side thereof according to the collected path segment set in the right side of the top-level PCE). The process is similar to the processes 3, 4, 5, and 6.

Finally, the top-level PCE receives the path segment sets returned by the lower-level PCEs, computes an optimal end-to-end cross-domain path according to the path segment sets, and then returns the optimal path to the bottom-level PCE of the head node.

After receiving the path computation request acknowledgement sent by the top-level PCE, the bottom-level PCE of the head node returns the corresponding path information to the head node of the path computation request.

After receiving the computed path information, the head node may initiate a signaling to establish a corresponding path.

The above process relates to computation of an end-to-end cross-domain path, and actually the method for computing an end-to-end cross-domain diverse path is similar to the above process, so the details will not be described herein again.

As shown in FIG. 2, in this embodiment, the source node is N10, and the destination node requested by the source node is N40. For ease of understanding, the method according to this embodiment is divided into two sub-processes for illustration: 1) determination of top-level PCE; and 2) path computation. Specific processes are illustrated as follows.

1) Determination of Top-Level PCE

In step S11, N10 sends a path computation request message to PCE01. The message carries information about the source node N10 and information about the destination node N40.

In step S12, PCE01 that directly manages N10 receives the path computation request sent by N10, and PCE01 stores topology information of a computation domain managed thereby. PCE01 makes a judgment according to source and destination addresses in the path request message. The judgment result is that N10 and N40 are not located in the computation domain managed thereby, so PCE01 reports the path computation request message.

In step S13, it can be seen from FIG. 2 that, an upper-level PCE directly corresponding to PCE01 is PCE11. After receiving the reported path computation request message, PCE11 makes the same judgment as PCE01 does. The judgment result is that N40 is not located in a computation domain managed thereby, so PCE11 continuously reports the path computation request message.

In step S14, after receiving the path computation request message reported by PCE11, PCE21 makes the same judgment as PCE01 and PCE11 do. The judgment result is that the source node and the destination node belong to a computation domain of PCE21. Therefore, PCE21 is the top-level PCE.

It should be noted that, in the steps S11-S14, the top-level PCE is determined by reporting level by level. In other embodiments, PCE01 may also directly store computational capability information of other PCEs, so that PCE01 can directly determine that PCE21 is the top-level PCE, and directly send the path computation request message to PCE21.

2) Path Computation

In step S21, the PCE determines an optimal domain sequence. The determination of the optimal domain sequence may be implemented by determining domains that the path should pass through according to a network condition or a specifically configured policy of each domain, and the details will not be described herein. It is assumed in this embodiment that, the domain sequence is Domain1-Domain2-Domain3-Domain4.

In step S22, in a direct lower-level PCE of PCE21, Domain4 of N40 belongs to the computation domain of PCE12, so PCE21 sends a path computation command to PCE12. In this embodiment, the path computation command carries the optimal domain sequence, according to which subsequent intra-domain route computation for each domain is performed.

In step S23, in a direct lower-level PCE of PCE12, Domain4 belongs to the computation domain of PCE04, so PCE12 sends a path computation command to PCE04.

In step S24, after receiving the path computation command, PCE04 performs an intra-domain path computation, and returns an optimal intra-domain path segment set to PCE12. In this embodiment, PCE04 also sends information about an ingress node set corresponding to the intra-domain path segment set computed thereby to PCE12. The ingress nodes are just edge nodes of Domain04. The information about the ingress node set may be separately sent, or obtained by PCE12 from information about the path segment set.

In step S25, PCE12 receives the information returned by PCE04, determines an egress node set of Domain03 according to the ingress node set of each path segment in the returned information, uses the egress node set as destination nodes for path computation, and sends the path computation command to PCE03.

In step S26, PCE03 computes an optimal path segment set reaching a specified egress node set in Domain3, and returns a computation result to PCE12.

In step S27, after receiving the information returned by PCE03, PCE12 combines optimal path segment sets of Domain03 and Domain04 according to edge nodes of each path, computes a path segment set crossing Domain03 and Domain04, and returns the computation result to the top-level PCE21. In this embodiment, the combination is performed according to egress node information.

In step S28, PCE21 sends a path computation command to PCE11, and performs processing similar to steps S22-S27: PCE11 determines an egress node set of Domain02 according to an ingress node set of path segments crossing Domain03 and Domain04 returned by PCE12 to PCE21, and sends the egress node set to PCE02; PCE02 computes an intra-domain path segment set, and returns the intra-domain path segment set to PCE11; then, PCE01 computes an intra-domain path segment set, and returns the intra-domain path segment set to PCE11; and finally PCE11 combines a path segment set crossing Domain1 and Domain2.

In step S29, PCE21 computes an optimal cross-domain path set from N10 to N40 according to the path segment set crossing Domain03 and Domain04 as well as the path segment set crossing Domain01 and Domain02, and returns path information to PCE01, and finally, PCE01 returns the received path computation result to N10. In other embodiments, assuming that PCE21 further directly manages a routing domain Domain5, PCE21 computes an intra-domain path segment set of Domain5, and then combines the path segment set of Domain5, the path segment sets of Domain03 and Domain04, and the path segment set crossing Domain01 and Domain02, and computes an optimal cross-domain path from N10 to N40.

It should be noted that, in other embodiments, if a PCE that is not in Level0 directly manages a domain, the embodiments are basically the same as this embodiment, except that intra-domain path segments of the PCE is not computed by the bottom-level PCE. For example, assuming that PCE12 in this embodiment further directly manages another domain, PCE12 directly computes an intra-domain path segment set of the domain, and combines the path segment set of the domain and the path segment sets of Domain03 and Domain04 after receiving the path segment sets of Domain03 and Domain04. This embodiment is merely described by taking a three-level structure as an example. However, it should be understood by persons skilled in the art that, the present invention may also be applied to structures of one, two, or more levels.

In steps S22 and S23, PCE21 sends the path computation command to PCE04 level by level. In other embodiments, PCE21 may also directly send the path computation command to PCE04. In other embodiments, in steps S24 and S25, it may also be unnecessary to compute or send the ingress node set and the egress node set, but instead, PCE03 performs the route computation only according to intra-domain topology information in step S26.

In the above embodiments, Domain4 is computed at first, and Domain1 is computed at last. However, it should be understood by persons skilled in the art that, a sequence opposite to that in this embodiment may also be used in other embodiments, that is, the Domian1 is computed at first, and the Domian4 is computed at last.

Figure 3:
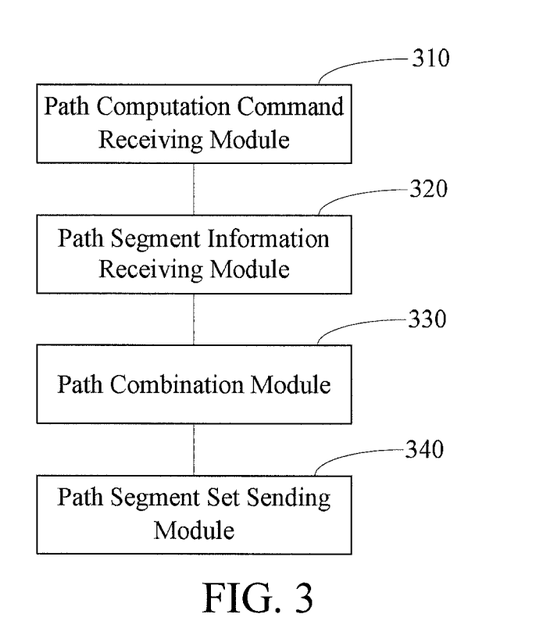
FIG. 3 is a structural view of a PCE according to an embodiment of the present invention.

Referring to FIG. 3, in an embodiment, the present invention further provides a PCE, which includes a path computation command receiving module 310, a path segment information receiving module 320, a path combination module 330, and a path segment set sending module 340.

The path computation command receiving module 310 is configured to receive a path computation command. The path computation command is directly sent by a top-level PCE, or transferred by the top-level PCE level by level.

The path segment information receiving module 320 is configured to send a path computation request according to a sequence of routing domains that a path to be established passes through after the path computation command receiving module 310 receives the path computation command. If the PCE has multiple lower-level PCEs, the path segment information receiving module 320 firstly sends the path computation request to a first lower-level PCE, and then sends the path computation request to another lower-level PCE after receiving a path segment set returned by the first lower-level PCE, until path segment sets returned by all lower-level PCEs are received. Of course, if the PCE has only one lower-level PCE, the path segment information receiving module 320 directly sends the path computation request to the lower-level PCE. In this embodiment, to facilitate the subsequent path segment combination process, the path computation request sent to another lower-level PCE carries egress node set information returned by the previous lower-level PCE, so that during route computation, a bottom-level PCE obtains an ingress node set according to the egress node set information, and then performs route computation by taking the ingress nodes as endpoints of intra-domain path segments.

The path combination module 330 is configured to combine the path segment sets received by the path segment information receiving module to generate a longer path segment set if multiple lower-level PCEs exist in the routing domains that the path to be established sequentially passes through, and send the longer path segment set to the path segment set sending module.

The path segment set sending module 340 is configured to send the received path segment sets to an upper-level PCE.

The PCE of this embodiment may further include a path computation module, configured to compute a path segment set of a routing domain managed thereby when the PCE is a bottom-level PCE or compute a path segment set of a routing domain directly managed thereby when the PCE is not a bottom-level PCE but directly manages the routing domain, and send a computation result to the path segment set sending module 340, so that the path segment set sending module 340 sends the path segment set to the upper-level PCE.

If the path establishment firstly starts from a source node of the path to be established, in this embodiment, when other routing domains exist in the same level as the computed routing domain, in addition to the PCE that firstly performs route computation, path computation modules of PCEs of other routing domains compute information about an egress node set, and send the information to the upper-level PCE. Alternatively, it may also be unnecessary to compute the information separately, but instead, the upper-level PCE obtains the information from the path segment set. The upper-level PCE generates an ingress node set of the next routing domain according to the egress node information, and sends the ingress node set to a PCE of the next domain, so that the PCE uses nodes collected in the ingress node set as ingress nodes of the path to compute the path segment set. In other embodiments, if the path establishment firstly starts from the source node of the path to be established, the egress node set is obtained according to the ingress node set, which is opposite to the above situation.

In an embodiment, the present invention further provides a route computation system, which includes a top-level PCE, a first bottom-level PCE, and an upper-level PCE receiving a path segment set sent by a lower-level PCE.

The top-level PCE is configured to determine routing domains that a path to be established sequentially passes through after receiving a path computation request, and send a path computation command. The path computation request carries information about a first node and a second node, and is configured to request establishing a direct path between the first node and the second node.

The first bottom-level PCE is configured to perform route computation on a routing domain managed thereby after receiving the path computation command, obtain a path segment set with the first node serving as an endpoint, and send the obtained path segment set to an upper-level PCE thereof. The path computation command may be directly sent by the top-level PCE to the first bottom-level PCE, or send by the top-level PCE to the first bottom-level PCE level by level.

The upper-level PCE receiving the path segment set sent by the lower-level PCE is configured to send the path computation command to another lower-level PCE according to the routing domains that the path to be established between the first node and the second node sequentially passes through, receive path segment sets sent by all lower-level PCEs, and combine and send all the received path segment sets to an upper-level PCE thereof, until the top-level PCE receives path segment sets sent by all lower-level PCEs thereof.

Here, the top-level PCE combines all the received path segment sets to generate a set of paths between the first node and the second node.

Each PCE in the system includes a path computation command receiving module 310, a path segment information receiving module 320, a path combination module 330, and a path segment set sending module 340.

The path computation command receiving module 310 is configured to receive a path computation command. The path computation command is directly sent by the top-level PCE, or transferred by the top-level PCE level by level.

The path segment information receiving module 320 is configured to send a path computation request according to a sequence of the routing domains that the path to be established passes through after the path computation command receiving module receives the path computation command. If the PCE has multiple lower-level PCEs, the path segment information receiving module 320 firstly sends the path computation request to a first lower-level PCE, and then sends the path computation request to another lower-level PCE after receiving a path segment set returned by the first lower-level PCE, until path segment sets returned by all lower-level PCEs are received. Of course, if the PCE has only one lower-level PCE, the path segment information receiving module 320 directly sends the path computation request to the lower-level PCE. In this embodiment, to facilitate the subsequent path segment combination process, the path computation request sent to another lower-level PCE carries egress node set information returned by the previous lower-level PCE, so that during route computation, the bottom-level PCE obtains an ingress node set according to the egress node set information, and then performs route computation by taking the ingress nodes as endpoints of intra-domain path segments.

The path combination module 330 is configured to combine the received path segment sets if multiple lower-level PCEs exist in the routing domains that the path to be established sequentially passes through, and send the combined path segment sets.

The path segment set sending module 340 is configured to send the received combined path segment sets to an upper-level PCE.

The PCE of this embodiment may further include a path computation module, configured to compute a path segment set of a routing domain managed thereby when the lower-level PCE is a bottom-level PCE or compute a path segment set of a routing domain directly managed thereby when the lower-level PCE is not a bottom-level PCE but directly manages the routing domain, and send a computation result to the path segment set sending module 340, so that the path segment set sending module 340 sends the path segment set to the upper-level PCE.

If the path establishment firstly starts from a source node of the path to be established, in this embodiment, when other routing domains exist in the same level as the computed routing domain, in addition to the PCE that firstly performs route computation, path computation modules of PCEs of other routing domains compute information about an egress node set, and send the information to the upper-level PCE. Alternatively, it may also be unnecessary to compute the information separately, but instead, the upper-level PCE obtains the information from the path segment set. The upper-level PCE generates an ingress node set of the next routing domain according to the egress node information, and sends the ingress node set to a PCE of the next domain, so that the PCE uses nodes collected in the ingress node set as ingress nodes of the path to compute the path segment set. In other embodiments, if the path establishment firstly starts from the source node of the path to be established, the egress node set is obtained according to the ingress node set, which is opposite to the above situation.

It is clear to persons skilled in the art that all or a part of the steps in the technical solutions provided by the above embodiments may be accomplished through hardware, or through software plus necessary universal hardware platform. Base on this, the technical solutions of the present invention may be embodied in the form of a software product. The software product may be stored in a nonvolatile storage medium (for example, a CD-ROM, a USB flash drive, or a removable hard disk) and include several instructions configured to instruct a computer equipment (for example, a personal computer, a server, or a network equipment) to perform the method according to the embodiments of the present invention.

Finally, it should be noted that the above embodiments are provided merely for describing the technical solutions of the present invention, but not intended to limit the present invention. It can be understood by persons of ordinary skill in the art that although the present invention has been described in detail with reference to the preferred embodiments, modifications can be made to the specific implementation of the present invention, or equivalent replacements can be made to some technical features without departing from the principle of technical solutions of the present invention, and such modifications or equivalent replacements shall fall within the protection scope of the present invention.

What is claimed is:

1. A route computation method, comprising:
receiving, by a bottom-level path computation element (PCE) which manages a routing domain including a destination node, a path computation command, performing a route computation on the routing domain managed by the bottom-level PCE, obtaining a path segment set with a destination node serving as an endpoint, and sending the obtained path segment set to an upper-level PCE of the bottom-level PCE, wherein the path computation command carries information about routing domains that a path to be established between a source node and the destination node sequentially passes through;

sending, by the upper-level PCE receiving the path segment set sent by a first lower-level PCE, the path computation command to a second lower-level PCE, which is next to the first lower-level PCE in the direction from the destination node to the source node, according to the routing domains that the path to be established between the source node and the destination node sequentially passes through, receiving path segment sets sent by all lower-level PCEs, and combining and sending all the received path segment sets to an upper-level PCE of the upper-level PCE, until a top-level PCE receives path segment sets sent by all lower-level PCEs of the top-level PCE, wherein the path computation command sent by the upper-lever PCE to the second lower-level PCE carries information of egress nodes of a path segment set to be computed by the second lower-level PCE, and said information of egress nodes of the path segment set to be computed by the second lower-level PCE is computed by the upper-level PCE according to information of the ingress node of each path segment of the path segment set sent by the first lower-level PCE; and combining, by the top-level PCE, all the received path segment sets to generate a set of paths between the destination node and the source node.

2. The method according to claim 1, wherein
sending, by the upper-level PCE, a received path segment set to an upper-level PCE of the upper-level PCE, if the upper-level PCE only has one lower-level PCE.

3. The method according to claim 1, wherein the receiving, by the bottom-level path computation element (PCE) which manages the routing domain including the destination node, the path computation command comprises:
sending, by the top-level PCE, the path computation command to the bottom-level PCE which manages the routing domain including the destination node; or
sending, by the top-level PCE, the path computation command to a lower-level PCE of the top-level PCE, and sending, by the lower-level PCE of the top-level PCE, the path computation command to a lower-level PCE of the lower-level PCE of the top-level PCE, until the bottom-level PCE, which manages the routing domain including the destination node, receives the path computation command.

4. A route computation method, comprising:
receiving a path computation command;
sending the path computation command to lower-level path computation elements (PCEs) one by one according to a sequence of routing domains that a path to be established passes through, wherein sending the path computation command to lower-level path computation elements (PCEs) one by one according to a sequence of routing domains that a path to be established passes through is that: receiving a path segment set returned by a first lower-level PCE, and sending the path computation command to another lower-level PCE, which is next to the first lower-level PCE in the direction from a destination node to a source node of the path to be established, according to a sequence of routing domains that the path to be established passes through, until path segment sets returned by all lower-level PCEs are received, wherein the path computation command sent to the second lower-level PCE carries information of egress nodes of a path segment set to be computed by the second lower-level PCE, and said information of egress nodes of the path segment set to be computed by the second lower-level PCE is computed according to information of the ingress node of each path segment of the path segment set sent by the first lower-level PCE;
combining the received path segment sets, and sending the combined path segment sets; and
sending the received combined path segment sets to an upper-level PCE.

5. A route computation system, comprising:
a top-level path computation element (PCE), configured to receive a path computation request which carries information about a source node and a destination node, compute routing domains that a path to be established between the source node and the destination node sequentially passes through, and directly send a path computation command to a bottom-level PCE which manages a routing domain including the destination node, or send the path computation command to the bottom-level PCE level by level;
the bottom-level PCE, configured to perform a route computation on the routing domain managed by the bottom-level PCE after receiving the path computation command, obtain a path segment set with the destination node serving as an endpoint, and send the obtained path segment set to an upper-level PCE of the bottom-level PCE; and
the upper-level PCE receiving the path segment set sent by a first lower-level PCE, configured to send the path computation command to a second lower-level PCE, which is next to the first lower-level PCE in the direction from the destination node to the source node, according to the routing domains that the path to be established between the source node and the destination node sequentially passes through, receive path segment sets sent by all lower-level PCEs, and combine and send all the received path segment sets to an upper-level PCE of the upper-layer PCE receiving the path segment set sent by the first lower-level PCE, until the top-level PCE receives path segment sets sent by all lower-level PCEs of the top-level PCE, wherein the route computation command sent by the upper-lever PCE to the second lower-level PCE carries information of egress nodes of a path segment set to be computed by the second lower-level PCE, and said information of egress nodes of the path segment set to be computed by the second lower-level PCE is computed by the upper-level PCE according to information of the ingress node of each path segment of the path segment set sent by the first lower-level PCE;
wherein the top-level PCE combines all the received path segment sets to generate a set of paths between the source node and the destination node.

6. A route computation method comprising:
receiving, by a bottom-level path computation element (PCE) which manages a routing domain including a source node, a path computation command, performing a route computation on the routing domain managed by the bottom-level PCE, obtaining a path segment set with the source node serving as an endpoint, and sending the obtained path segment set to an upper-level PCE of the bottom-level PCE, wherein the path computation command carries information about routing domains that the path to be established between the source node and the destination node sequentially passes through;
sending, by the upper-level PCE receiving the path segment set sent by a first lower-level PCE, the path computation command to a second lower-level PCE, which is next to the first lower-level PCE in the direction from the source node to the destination node, according to the routing domains that the path to be established between the source node and the destination node sequentially passes through, receiving path segment sets sent by all lower-level PCEs, and combining and sending all the received path segment sets to an upper-level PCE of the upper-level PCE, until a top-level PCE receives path segment sets sent by all lower-level PCEs of the top-level PCE, wherein the route computation command sent by the upper-lever PCE to the second lower-level PCE carries information of ingress nodes of a path segment set to be computed by the second lower-level PCE, and said information of ingress nodes of the path segment set to be computed by the second lower-level PCE is computed by the upper-level PCE according to information of the egress node of each path segment of the path segment set sent by the first lower-level PCE; and combining, by the top-level PCE, all the received path segment sets to generate a set of paths between the source node and the destination node.

7. The method according to claim 6, wherein sending, by the upper-level PCE, a received path segment set to an upper-level PCE of the upper-level PCE, if the upper-level PCE only has one lower-level PCE.

8. The method according to claim 6, wherein the receiving, by the bottom-level path computation element (PCE) which manages the routing domain including the source node, the path computation command comprise:

sending, by the top-level PCE, the path computation command to the bottom-level PCE which manages the routing domain including the source node; or sending, by the top-level PCE, the path computation command to a lower-level PCE of the top-level PCE, and sending, by the lower-level PCE of the top-level PCE, the path computation command to a lower-level PCE of the lower-level PCE of the top-level PCE, until the bottom-level PCE, which manages the routing domain including the source node, receives the path computation command.

9. A route computation method comprising:

receiving a path computation command;

sending the path computation command to lower-level path computation elements (PCEs) one by one according to a sequence of routing domains that the path to be established passes through, wherein sending the path computation command to lower-level path computation elements (PCEs) one by one according to a sequence of routing domains that a path to be established passes through is that: receiving a path segment set returned by a first lower-level PCE, and sending the path computation command to a second lower-level PCE which is next to the first lower-level PCE in the direction from a source node to a destination node of the path to be established, according to a sequence of routing domains that the path to be established passes through, until path segment sets returned by all lower-level PCEs are received, wherein the path computation command sent to the second lower-level PCE carries information of ingress nodes of a path segment set to be computed by the second lower-level PCE, and said information of ingress nodes of the path segment set to be computed by the second lower-level PCE is computed according to information of the egress node of each path segment of the path segment set sent by the first lower-level PCE;

combining the received path segment sets, and sending the combined path segment sets; and sending the received combined path segment sets to an upper-level PCE.

10. A route computation system comprising:

a top-level path computation element (PCE), configured to receive a path computation request which carries information about a source node and a destination node, compute routing domains that a path to be established between the source node and the destination node sequentially passes through, and directly send a path computation command to a bottom-level PCE which manage a routing domain including the source node, or send the path computation command to the bottom-level PCE level by level;

the bottom-level PCE, configured to perform a route computation on the routing domain managed by the bottom-level PCE receiving the path computation command, obtain a path segment set with the source node serving as an endpoint, and send the obtained path segment set to an upper-level PCE of the bottom-level PCE; and the upper-level PCE receiving the path segment set sent by a first lower-level PCE, configured to send the path computation command to a second lower-level PCE, which is next to the first lower-level PCE in the direction from the source node to the destination node, according to the routing domains that the path to be established between the source node and the destination node sequentially passes through, receive path segment sets sent by all lower-level PCEs, and combine and send all the received path segment sets to an upper-level PCE of the upper-layer PCE receiving the path segment set sent by the first lower-level PCE, until the top-level PCE receives path segment sets sent by all lower-level PCEs of the top-level PCE, wherein the route computation command sent by the upper-lever PCE to the second lower-level PCE carries information of ingress nodes of a path segment set to be computed by the second lower-level PCE, and said information of ingress nodes of the path segment set to be computed by the second lower-level PCE is computed by the upper-level PCE according to information of the egress node of each path segment of the path segment set sent by the first lower-level PCE;

wherein the top-level PCE combines all the received path segment sets to generate a set of paths between the destination node and the source node.

* * * * *